(12) United States Patent
Wong et al.

(10) Patent No.: US 7,937,039 B2
(45) Date of Patent: May 3, 2011

(54) OBJECT TAGGING SYSTEM AND METHOD

(75) Inventors: Yoon Kean Wong, Redwood City, CA (US); David Kammer, Seattle, WA (US); Russell Y. Webb, Christchruch (NZ); Steven C. Lemke, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 11/706,872

(22) Filed: Feb. 15, 2007

(65) Prior Publication Data
US 2007/0207733 A1 Sep. 6, 2007

Related U.S. Application Data

(63) Continuation of application No. 09/998,079, filed on Nov. 30, 2001, now abandoned.

(51) Int. Cl.
*H04B 7/00* (2006.01)

(52) U.S. Cl. .......... 455/41.2; 455/41.1; 455/456.1; 455/456.3

(58) Field of Classification Search ........... 455/41.2, 455/456.1, 456.3, 456.6, 457, 41.1
See application file for complete search history.

(56) References Cited

U.S. PATENT DOCUMENTS

| | | | |
|---|---|---|---|
| 4,907,290 A | 3/1990 | Crompton | |
| 5,010,547 A | 4/1991 | Johnson et al. | |
| 5,012,219 A | 4/1991 | Henry | |
| 5,075,684 A | 12/1991 | DeLuca | |
| 5,359,317 A | 10/1994 | Gomez et al. | |
| 5,394,140 A | 2/1995 | Wong et al. | |
| 5,430,436 A | 7/1995 | Fennell | |
| 5,594,796 A | 1/1997 | Grube et al. | |
| 5,612,682 A | 3/1997 | DeLuca et al. | |
| 5,650,776 A | 7/1997 | Mitchell et al. | |
| 5,699,244 A | 12/1997 | Clark, Jr. et al. | |
| 5,705,995 A | 1/1998 | Laflin et al. | |
| 5,720,200 A | 2/1998 | Anderson et al. | |
| 5,850,187 A | 12/1998 | Carrender et al. | |
| 5,875,434 A | 2/1999 | Matsuoka et al. | |
| 5,884,168 A * | 3/1999 | Kolev et al. | 455/432.1 |
| 5,901,358 A | 5/1999 | Petty et al. | |
| 5,903,852 A | 5/1999 | Schaupp, Jr. et al. | |
| 5,929,848 A * | 7/1999 | Albukerk et al. | 715/700 |
| 5,938,721 A | 8/1999 | Dussell et al. | |
| 5,958,006 A | 9/1999 | Eggleston et al. | |

(Continued)

FOREIGN PATENT DOCUMENTS

EP 1 494 488 1/2005

(Continued)

OTHER PUBLICATIONS

U.S. Appl. No. 11/897,240, filed Aug. 29, 2007, Finkelstein et al.

(Continued)

*Primary Examiner* — Tuan A Pham
(74) *Attorney, Agent, or Firm* — Foley & Lardner LLP

(57) ABSTRACT

A method of indexing information stored on a portable electronic device. The method includes receiving an association signal by the portable electronic device the association signal providing an indication of adjacent resources, accessing a database including a table storing relationships between data stored on the portable electronic device and the association signal, and indexing the data based on the relationships accessed in the database.

19 Claims, 3 Drawing Sheets

U.S. PATENT DOCUMENTS

| | | | |
|---|---|---|---|
| 5,974,330 | A | 10/1999 | Negishi |
| 6,016,476 | A | 1/2000 | Maes et al. |
| 6,047,579 | A | 4/2000 | Schmitz |
| 6,061,561 | A | 5/2000 | Alanara et al. |
| 6,104,291 | A | 8/2000 | Beauvillier et al. |
| 6,111,538 | A | 8/2000 | Schuchman et al. |
| 6,157,630 | A | 12/2000 | Adler et al. |
| 6,177,905 | B1 | 1/2001 | Welch |
| 6,182,010 | B1 | 1/2001 | Berstis |
| 6,182,221 | B1 | 1/2001 | Hsu et al. |
| 6,243,689 | B1 | 6/2001 | Norton |
| 6,246,376 | B1 | 6/2001 | Bork et al. |
| 6,259,405 | B1 | 7/2001 | Stewart et al. |
| 6,297,737 | B1 | 10/2001 | Irvin |
| 6,307,919 | B1 | 10/2001 | Yoked |
| 6,313,745 | B1 | 11/2001 | Suzuki |
| 6,346,881 | B1 | 2/2002 | Davidson |
| 6,360,101 | B1 | 3/2002 | Irvin |
| 6,389,290 | B1 | 5/2002 | Kikinis et al. |
| 6,404,761 | B1 | 6/2002 | Snelling et al. |
| 6,424,845 | B1 | 7/2002 | Emmoft et al. |
| 6,456,234 | B1 | 9/2002 | Johnson |
| 6,487,180 | B1 | 11/2002 | Borgstahl et al. |
| 6,499,000 | B2 | 12/2002 | Flentov et al. |
| 6,542,750 | B2 | 4/2003 | Hendrey et al. |
| 6,601,093 | B1 | 7/2003 | Peters |
| 6,681,108 | B1 | 1/2004 | Terry et al. |
| 6,687,608 | B2 | 2/2004 | Sugimoto et al. |
| 6,731,613 | B1 | 5/2004 | Provance |
| 6,757,718 | B1 | 6/2004 | Halverson et al. |
| 6,772,331 | B1 | 8/2004 | Hind et al. |
| 6,832,178 | B1 | 12/2004 | Fernandez et al. |
| 6,847,823 | B2 | 1/2005 | Lehikoinen et al. |
| 6,885,971 | B2 | 4/2005 | Vock et al. |
| 6,907,134 | B1 | 6/2005 | Yamada et al. |
| 6,920,328 | B2 | 7/2005 | Wollrab |
| 6,934,664 | B1 | 8/2005 | Webb et al. |
| 6,941,270 | B1 | 9/2005 | Hannula |
| 6,963,818 | B2 | 11/2005 | Flentov et al. |
| 6,982,962 | B1 | 1/2006 | Lunsford et al. |
| 7,006,817 | B2 | 2/2006 | Awada et al. |
| 7,084,758 | B1 | 8/2006 | Cole |
| 7,092,846 | B2 | 8/2006 | Vock et al. |
| 7,103,370 | B1 | 9/2006 | Creemer |
| 7,171,331 | B2 | 1/2007 | Vock et al. |
| 7,212,827 | B1 * | 5/2007 | Veschl ..................... 455/456.1 |
| 7,266,379 | B2 | 9/2007 | Blight et al. |
| 7,274,299 | B2 | 9/2007 | Osman |
| 7,336,964 | B2 | 2/2008 | Casey |
| 7,360,248 | B1 | 4/2008 | Kanevsky et al. |
| 2002/0010617 | A1 | 1/2002 | Hamaguchi et al. |
| 2002/0019584 | A1 | 2/2002 | Schulze et al. |
| 2002/0036991 | A1 | 3/2002 | Inoue |
| 2002/0061031 | A1 | 5/2002 | Sugar et al. |
| 2002/0078075 | A1 | 6/2002 | Colson et al. |
| 2002/0086680 | A1 | 7/2002 | Hunzinger |
| 2002/0136184 | A1 | 9/2002 | Liang et al. |
| 2002/0147717 | A1 | 10/2002 | Barros et al. |
| 2002/0184331 | A1 | 12/2002 | Blight et al. |
| 2002/0184418 | A1 | 12/2002 | Blight |
| 2002/0194498 | A1 | 12/2002 | Blight et al. |
| 2003/0022682 | A1 * | 1/2003 | Weston et al. ................ 455/512 |
| 2003/0052907 | A1 | 3/2003 | Rekimoto |
| 2003/0054846 | A1 | 3/2003 | Parry |
| 2004/0176107 | A1 | 9/2004 | Chadha |
| 2004/0193499 | A1 | 9/2004 | Ortiz et al. |
| 2004/0207522 | A1 | 10/2004 | McGee et al. |
| 2005/0012611 | A1 | 1/2005 | Osman |
| 2005/0227711 | A1 | 10/2005 | Orwant et al. |
| 2006/0061488 | A1 | 3/2006 | Dunton |
| 2006/0095348 | A1 | 5/2006 | Jones et al. |
| 2007/0149208 | A1 | 6/2007 | Syrbe et al. |
| 2007/0185980 | A1 | 8/2007 | Abraham et al. |
| 2007/0192277 | A1 | 8/2007 | Jackson |
| 2007/0200732 | A1 | 8/2007 | Bachmaier |
| 2007/0202886 | A1 | 8/2007 | Dhebri et al. |
| 2007/0225004 | A1 | 9/2007 | Tang et al. |
| 2007/0271367 | A1 | 11/2007 | Yardeni et al. |
| 2008/0020786 | A1 | 1/2008 | Smith et al. |
| 2008/0021637 | A1 | 1/2008 | Staton et al. |
| 2008/0036653 | A1 | 2/2008 | Huston |
| 2008/0045173 | A1 | 2/2008 | Park et al. |
| 2008/0045236 | A1 | 2/2008 | Nahon et al. |
| 2008/0125102 | A1 | 5/2008 | Abel et al. |
| 2009/0298511 | A1 | 12/2009 | Paulson |

FOREIGN PATENT DOCUMENTS

| | | |
|---|---|---|
| KR | 2001 0109963 | 12/2001 |
| KR | 2005 0087189 | 8/2005 |
| KR | 2005 0095477 | 9/2005 |
| KR | 2006 0008100 | 1/2006 |
| WO | WO 2007/118125 | 10/2007 |
| WO | WO 2008/027836 | 3/2008 |

OTHER PUBLICATIONS

U.S. Appl. No. 60/725,892 entitled "Wireless Connectivity User-Interface Features", filed Oct. 11, 2006, 3 pages.

US Office Action on U.S. Appl. No. 11/809,198, mail date May 21, 2009, 19 pgs.

US Office Action on U.S. Appl. No. 11/540,909, mail date Jun. 10, 2009, 11 pgs.

US Office Action on U.S. Appl. No. 11/823,850, mail date Apr. 27, 2009, 14 pgs.

U.S. Appl. No. 11/823,850, filed Jun. 28, 2007, Kammer.

U.S. Appl. No. 11/809,198, filed May 31, 2007, Blight et al.

U.S. Appl. No. 11/540,909, filed Sep. 29, 2006, Blight et al.

U.S. Appl. No. 10/006,952, filed Nov. 5, 2001, Kammer.

"New Riverside University Dictionary", published by the Riverside Publishing Company, Copyright 1984 by Houghton Mifflin Company, p. 81.

Skyhook Wireless, "How It Works", printed from internet address: http://developer.skyhookwireless.com/how-it-works/, on Apr. 12, 2007, 2 pages.

Palm™ m505 Handheld, printed from internet address: http:/www.palm.com/products/palmm505/ on Sep. 20, 2001 (5 views).

Notice of Allowance for U.S. Appl. No. 11/809,198, mail date Aug. 13, 2009, 11 pages.

Notice of Allowance for U.S. Appl. No. 11/540,909, mail date Sep. 4, 2009, 6 pages.

Office Action for U.S. Appl. No. 11/823,850, mail date Nov. 23, 2009, 15 pages.

International Search Report and Written Opinion from International Application No. PCT/US2009/045387 dated Feb. 17, 2010, 8 pages.

* cited by examiner

OBJECT TAGGING SYSTEM AND METHOD

CROSS-REFERENCE TO RELATED APPLICATION

This application is a Continuation of U.S. application Ser. No. 09/998,079 filed Nov. 30, 2001, which is incorporated by reference herein in its entirety.

BACKGROUND

Handheld computers and other portable electronic devices typically contain various types of information including phone lists, to do lists, calendars, notes, personal interest lists, graphics files, video files, audio files, maps, directions, applications, etc. During use of a mobile device a user may typically desire access to different information or different types of information when they carry the device near certain known objects, such as but not limited to landmarks, access points, and/or other physical objects. Accordingly, when the device is near certain known objects, the user may desire access to specific information whenever that known object is encountered. Therefore, it would be desirable for the portable device to access or provide simplified and/or automatic access to information which was assumed to be desired based on the encounter with the known object.

Accordingly, there is a need for a method to associate information on a portable electronic device with certain known objects. There is also a need for a system in which certain data on the portable electronic device is automatically associated with the known object. Further, there is a need for a program running on a portable electronic device that allows for the association and indexing of information stored on the device based on an encounter with a known object.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

One embodiment of the invention relates to a method of indexing information stored on a portable electronic device. The method includes receiving an association signal by the portable electronic device the association signal providing an indication of adjacent resources, accessing a database including a table storing relationships between data stored on the portable electronic device and the association signal, and indexing the database on the relationships accessed in the database.

Another embodiment of the invention relates to a portable electronic device. The portable electronic device includes a processor, a transceiver coupled to the processor, the transceiver configured to receive and transmit communication signals, a memory coupled to the processor, and a program stored in the memory and running on the processor configured to receive an association signal by the transceiver, the association signal providing an indication of adjacent resources, the program further configured to access a database including a table storing relationships between data stored on the portable electronic device and the association signal, and the program configured to index the data based on the relationships accessed in the database.

Yet another embodiment of the invention relates to a handheld computer. The handheld computer includes a processor, a memory coupled to the processor, a display coupled to the processor, and a program running on the processor and configured to identify an adjacent known object and configured to index information stored in the memory of the device based on the known object.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 4:
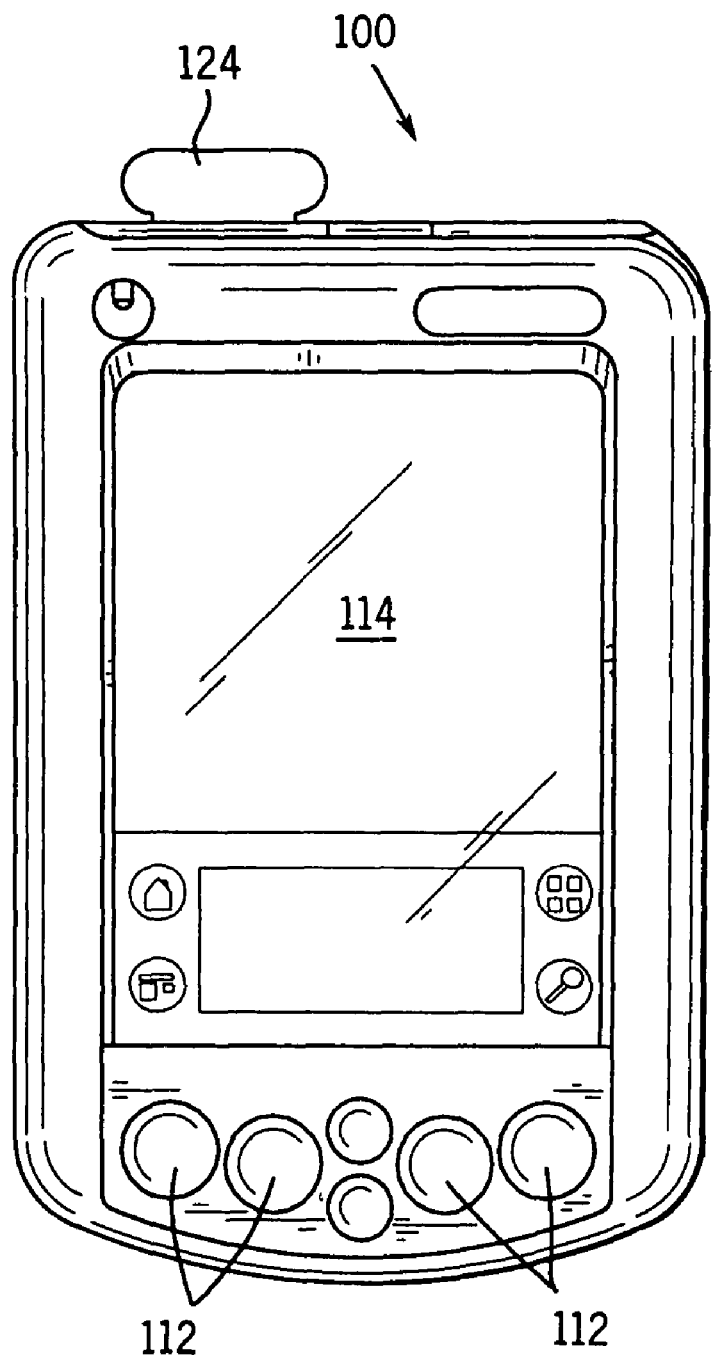
FIG. 4 is an exemplary embodiment of a handheld computer.

Referring to FIG. 4, a portable electronic device, shown as, but not limited to, handheld computer 100 is depicted according to an exemplary embodiment. Handheld computer 100 may include palm style computers manufactured by Palm, Inc., of Santa Clara, Calif. Other exemplary embodiments may include Windows CE handheld computers, or other handheld computers and personal digital assistants, as well as mobile telephones, and other mobile computing devices.

Preferably, handheld computer 100 includes memory, a processor, and interactive hardware and software that performs functions such as, but not limited to maintaining calendars, phone lists, task lists, notepads, calculator applications, spreadsheets, games, and other applications capable of running on a computing device. Further, handheld computer 100 may be configured for such functions as voice memo recording and playback, as well as communications network connectivity, internet connectivity, wireless telephony, among others.

Handheld computer 100, depicted in FIG. 4 includes a plurality of input function keys 112 and a display 114 having graphical user interface features. Display 114 may be provided with a touch screen interface that allows a user to select and alter displayed content using a pointer, such as, but not limited to, a stylus, a pen tip, a fingertip, or other pointing devices.

Handheld computer 100 may also include local area wireless technology to permit wireless communication with other portable electronic devices and computing devices that have compatible communication technology. The local area wireless technology may be Bluetooth or IEEE 802.11 compatible, or may support any of a variety of other wireless communication protocols.

To support local area wireless communications, handheld computer 100 may include wireless connectivity software integrated into the operating system or stored in memory of handheld computer 100 or further added via an expansion card or transferred from another computer or computer system. Further, to effectuate local area communications, handheld computer 100 may include an RF transceiver 124, or other electromagnetic reception and transmission device. RF transceiver 124 may be provided on handheld computer 100 as part of an expansion card or may alternatively be integrated into handheld computer 100. Referring to FIG. 4, handheld computer 100 may alternatively transmit and receive local area wireless communications via infrared port 120. Expansion card 124, including an RF transceiver, may be installed in handheld computer 100 via an expansion slot 122 used to house expansion cards such as, but not limited to, secured digital (SD) cards. One such expansion card 124 may be disposed in an expansion card slot in handheld computer 100. An installed expansion card 124 may be used for local area wireless communications. RF transceiver 124 may be a Bluetooth transceiver and IEEE 802.11 transceiver, or any of a variety of other RF, VHF, UHF, ultrasonic, or other wireless transceiver devices.

Figure 3:
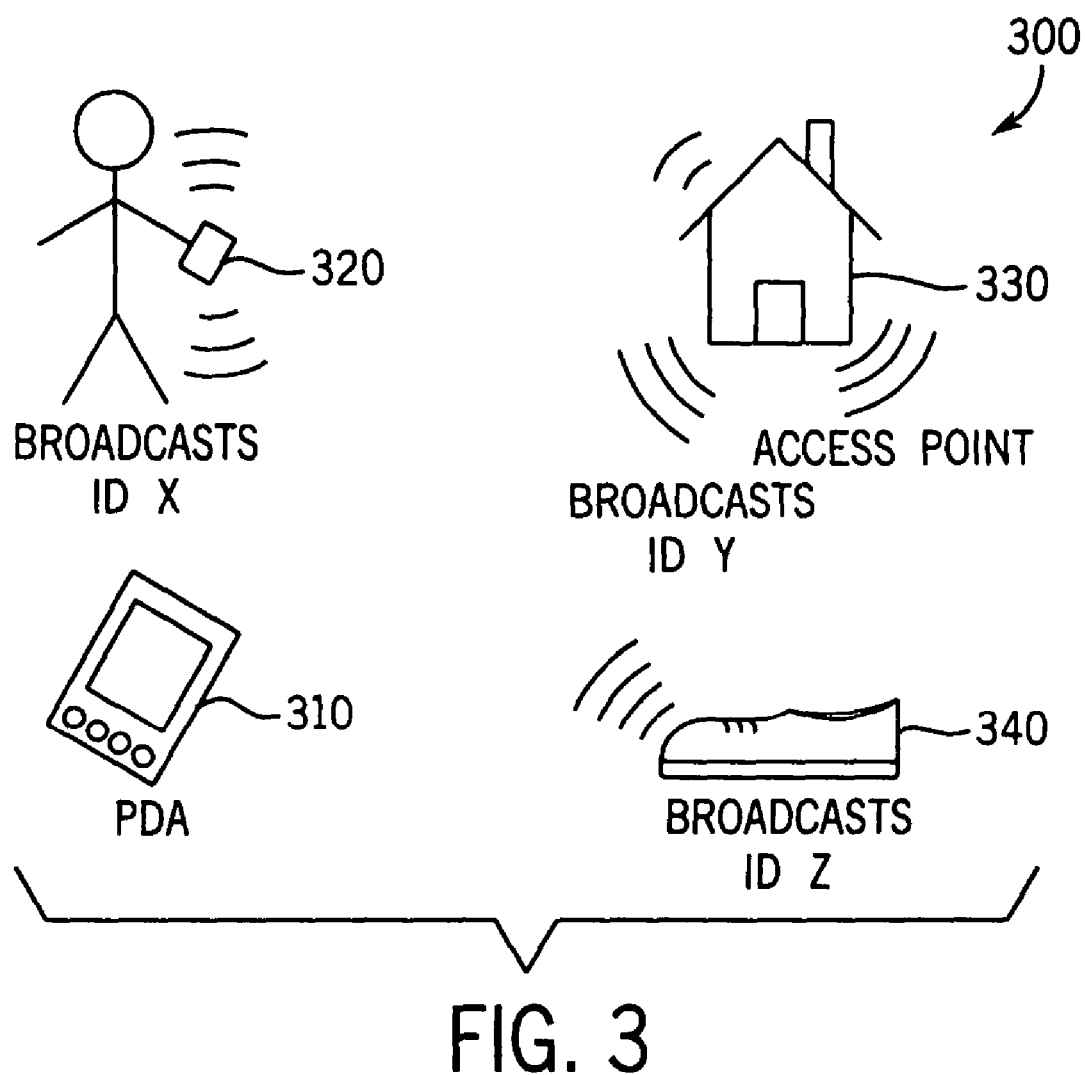
FIG. 3 is an exemplary diagram of a portable electronic device and data association system.

Referring to FIG. 3, handheld computer 310 may be capable of communicating with other electronic devices within a local area. For example, handheld computer 310 may be able to communicate with various other local devices such as, but not limited to, an individual's mobile telephone 320. Mobile telephone 320 may include a Bluetooth transceiver or other transceivers. Phone 320 may broadcast a unique identifier (ID) associated with phone 320. In another exemplary embodiment, a person's shoe 340 may include a wireless transceiver device such as a Bluetooth transceiver. Such a shoe may indicate any of a variety of information, such as, but not limited to, the wearer of the shoe, for example, or any other unique identifier. Further still, in an exemplary embodiment, a networking access point, such as a Bluetooth access point 330 may be in communication with handheld computer 310. Bluetooth access point 330 may be configured to broadcast a unique identifier. Further, access point 330 may be associated with a specific location, for example, access point 330 may be located in the handheld user's home or any other home, office, or building. In such a case, handheld computer 310 may associate access point 330 with not only the network to which it is connected but also to the location at which access point 330 is located. In further exemplary embodiments, any of a variety of other known objects or access points may include, but are not limited to, other computing devices having wireless communication capability, such as soda machines, other handheld computing devices, laptop computers, cellular telephones, local area network access points, automated teller machines (ATMs), etc.

Figure 1:
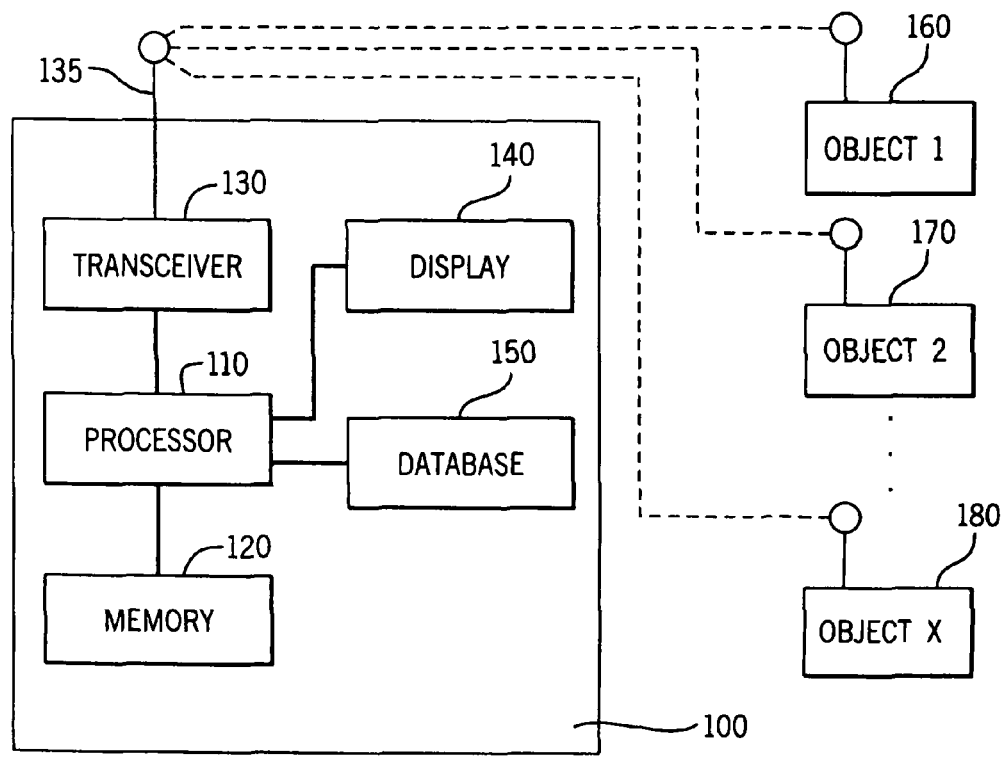
FIG. 1 is a block diagram of a wireless portable electronic device object identification and association system.

Referring now to FIG. 1, a handheld computer or other portable electronic device 100 is depicted. Handheld computer 100 includes a processor 110 which may be any of a variety of conventional processing devices. A memory 120 is coupled to processor 110. Memory 120 may be any of a variety of memory devices including, but not limited to read only memory (ROM), random access memory (RAM), flash memory, etc. Memory 120 may be utilized to store programs running on processor 110, and/or may be used to store other types of information. A transceiver 130 is coupled to processor 110. Transceiver 130 may be any of a variety of wireless transceivers including, but not limited to RF or other electromagnetic transceiver devices, and/or infrared or ultrasonic devices, among others. In an exemplary embodiment, transceiver 130 includes an antenna 135 for transmitting and receiving communication signals. Handheld computer 100 also includes a display 140. Display 140 may be any of a variety of displays including, but not limited to an LCD touch screen display. Display 140 may be used to display information to a user of handheld computer 100. A database 150 may be stored on handheld computer 100. Database 150 may be stored in memory 120 or may be stored in any of a variety of other storage devices including peripheral devices such as a disk drive or memory card. Further, in an alternative embodiment, database 150 may be stored on a server computer which is accessed over a wireless communication link using transceiver 130.

Because of the portability and ease of use and access to handheld computer 100, it is often desirable for a user of handheld computer 100 to take and/or share notes about a particular person, place, and/or thing, and further to access these notes at a time when the known object, person, or item is present. In systems of the prior art, it is required that the user remember that such notes are available and, further, remembers how to access them. As wireless networking environments become even more data rich, this problem becomes more evident. In a data rich environment, the user of handheld computer 100 may be unaware of exactly what data is available on the portable device. Thus, a method to automatically pull up relevant data when a known object is nearby is desirable.

Referring again to FIG. 1, known objects 160, 170, and 180 may be in nearby proximity to handheld computer 100, such that they are in wireless communications with handheld computer 100. Information that is collected by handheld computer 100 or is input by a user of handheld computer 100 may be associated with a unique, detectable identifier, that is associated with each of individual objects 160, 170, and/or 180. The information that is collected or input relating to each object may be stored on handheld computer 100 and an association and/or relationship of the object to the data may be stored in database 150. In an alternative embodiment, the data and the association and/or relationship may be stored in database 150. There may be many ways to provide unique identifiers for objects encountered by handheld computer 100. For example, biometric information may be used about people, or location information about places and/or stationary objects. Further, known objects, people, or locations may be associated with a unique wireless identifier (for example, a Bluetooth device address or alias), that the known object may advertise or broadcast. In the case that objects 160, 170, and 180 are broadcasting unique identifiers or association signals, the handheld computer may then access database 150 and identify relationships between stored data on handheld computer 100 and the association signals being received. The data may then be indexed based on the relationships accessed in the database. Once the relevant data is indexed, the data may be prioritized based on any of a number of factors including, but not limited to distance from each of the objects, importance of the objects, etc. Once the data is prioritized, the relevant data may be retrieved from storage on handheld computer 100.

Figure 2:
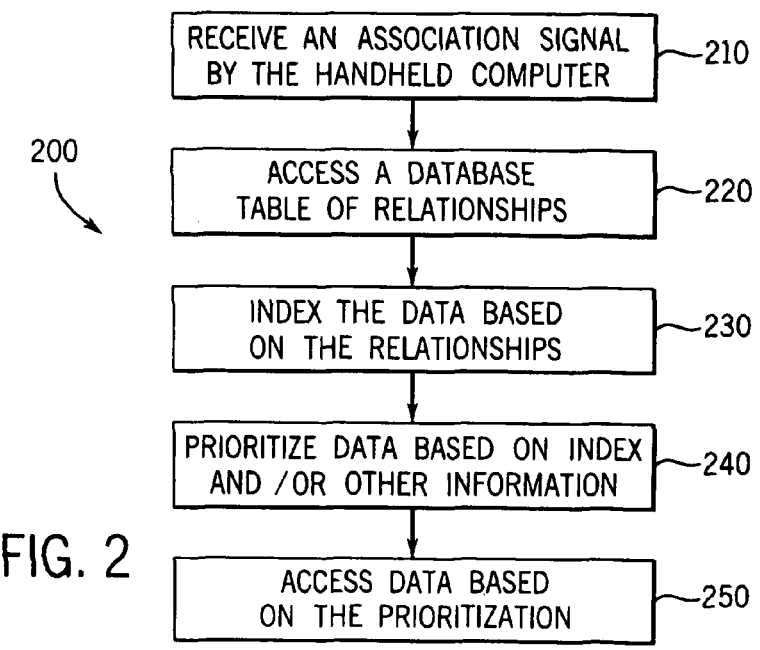
FIG. 2 is a block diagram of a process for associating data with objects.

Referring now to FIG. 2, an exemplary process for associating and/or relating data with objects and accessing the data 200 is depicted. A handheld computer or other electronic portable device receives association signals (step 210). When association signals or object identifiers are received by the handheld computer, a database is accessed, the database including relationships between data sets and association signals or identifiers (step 220). Based on the relationships retrieved from the database, the data is indexed (step 230). In an alternative embodiment, the data may be prioritized based on the index and/or based on any of a variety of other types of information, including distance and/or location (step 240). Further, in an alternative embodiment, data is then accessed on a handheld computer by the user automatically based on the prioritization (step 250).

Referring again to FIG. 3, a user of handheld computer 310 may approach a person carrying a phone 320. As the person is approached, the phone broadcasts an identifier which is received by handheld computer 310. Handheld computer 310 associates the received signal with the particular person and accesses information about the person. For example, handheld computer 310 may access calendar information associated with the person such as, the person's birthday is today, or any of a variety of other messages or lists, etc.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of accessing information stored on a portable electronic device, comprising:
   storing on the portable electronic device a table comprising identifiers associated with other objects and data associated with each identifier, wherein for at least some of the objects, the data is stored and associated with the identifiers automatically based at least in part on receiving the identifiers;
   storing on the portable electronic device personal information associated with a user of the portable electronic device;
   wirelessly receiving at the portable electronic device an identifier associated with a nearby object;
   prioritizing the data based on at least one factor, the at least one factor including one of a distance to and a location of the objects associated with the data; and
   accessing the data based on the identifier and the prioritization.

2. The method of claim 1, wherein the nearby object is a computing device.

3. The method of claim 2, wherein the nearby object is a portable electronic device.

4. The method of claim 1, further comprising displaying the accessed data.

5. The method of claim 1, wherein the data is accessed automatically.

6. The method of claim 1, wherein the personal information comprises a personal interest list.

7. The method of claim 1, wherein the personal information comprises personal notes.

8. The method of claim 1, wherein the personal information comprises personal location data.

9. The method of claim 1, wherein the data comprises personal information associated with a user of the nearby computing device.

10. The method of claim 9, wherein the personal information associated with the user of the nearby computing device comprises notes associated with contact information for the user of the nearby computing device.

11. The method of claim 1, wherein the portable electronic device comprises a personal digital assistant and a mobile telephone and is configured to provide internet connectivity.

12. The method of claim 11, wherein the portable electronic device comprises an expansion slot.

13. The method of claim 1, wherein the portable electronic device is a handheld computer.

14. A mobile computing device, comprising:
   a processing circuit configured to process mobile telephone and personal information management functions;
   a memory configured to store a plurality of identifiers associated with other objects, data associated with each identifier, and personal information associated with a user of the mobile computing device; and
   a wireless transceiver configured to receive an identifier associated with a nearby object, wherein the processing circuit is configured to access the data based on the identifier and the personal information; and
   wherein for at least some of the objects, the processing circuit is configured to automatically associate the data with the identifiers based on receiving the identifier; and
   wherein the processing circuit is configured to prioritize the data based on at least one factor, the at least one factor including one of a distance to and a location of the objects associated with the data;
   and wherein the processing circuit accesses the data further based on the prioritization of the data and the identifier.

15. The mobile computing device of claim 14, wherein the mobile computing device is a handheld computing device.

16. The mobile computing device of claim 14, wherein the processing circuit is configured to display the accessed data.

17. The mobile computing device of claim 16, wherein the processing circuit is configured to display the accessed data automatically.

18. The mobile computing device of claim 14, wherein the data comprises personal information associated with a user of the nearby object.

19. The mobile computing device of claim 14, wherein the nearby object is a portable computing device.

* * * * *